(12) United States Patent
Farrell et al.

(10) Patent No.: US 10,164,922 B2
(45) Date of Patent: Dec. 25, 2018

(54) SECURE ELECTRONIC MESSAGE CONVEYANCE

(75) Inventors: Colm Farrell, Clonsilla (IE); Liam Harpur, Skerries (IE); Patrick Joseph O'Sullivan, Ballsbridge (IE); Fred Raguillat, Dunboyne (IE); Carol Sue Zimmet, Boxborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 12/890,774

(22) Filed: Sep. 27, 2010

(65) Prior Publication Data

US 2012/0079034 A1  Mar. 29, 2012

(51) Int. Cl.
*G06F 15/16* (2006.01)
*H04L 12/58* (2006.01)
*H04L 29/06* (2006.01)

(52) U.S. Cl.
CPC ............ *H04L 51/12* (2013.01); *H04L 63/105* (2013.01)

(58) Field of Classification Search
USPC .................................. 709/201–207; 726/1–4
See application file for complete search history.

(56) References Cited

U.S. PATENT DOCUMENTS

| | | | |
|---|---|---|---|
| 7,149,893 B1 | 12/2006 | Leonard | |
| 7,457,842 B2 | 11/2008 | Hellmann | |
| 7,730,137 B1 * | 6/2010 | Toomey | H04L 51/12 709/206 |
| 7,912,908 B2 * | 3/2011 | Cai et al. | 709/206 |
| 8,028,162 B2 * | 9/2011 | Beattie et al. | 713/156 |
| 8,468,580 B1 * | 6/2013 | Casey | G06F 21/606 709/206 |
| 2003/0126439 A1 * | 7/2003 | Wheeler | H04L 63/083 713/168 |
| 2003/0131235 A1 * | 7/2003 | Wheeler | G06F 21/32 713/168 |
| 2004/0103022 A1 * | 5/2004 | Chilcoat, III | G06Q 30/02 705/14.16 |
| 2004/0128508 A1 * | 7/2004 | Wheeler | G06F 21/33 713/170 |

(Continued)

FOREIGN PATENT DOCUMENTS

WO   WO 2010/066617   * 12/2009

*Primary Examiner* — Amare F Tabor
(74) *Attorney, Agent, or Firm* — Cuenot, Forsythe & Kim, LLC (57) ABSTRACT

A method of secure electronic message conveyance. The method can include, via a processor, receiving a request to forward an electronic message originally received by a first user to at least a second user. The method also can include, based on content contained in the electronic message, selecting from a plurality of approval entities at least one approval entity that is to determine whether the electronic message is approved to be forwarded to the at least a second user, and receiving from the selected approval entity an indication that indicates whether the electronic message is approved to be forwarded to the second user. The method further can include, responsive to the selected approval entity approving the forwarding of the electronic message to the second user, automatically forwarding the electronic message to the second user.

21 Claims, 4 Drawing Sheets

(56) References Cited

U.S. PATENT DOCUMENTS

| | | | |
|---|---|---|---|
| 2004/0243260 A1* | 12/2004 | Law | G06Q 10/10 700/86 |
| 2004/0243824 A1* | 12/2004 | Jones | G06F 21/33 713/166 |
| 2005/0038886 A1 | 2/2005 | Garg | |
| 2006/0036701 A1* | 2/2006 | Bulfer et al. | 709/206 |
| 2007/0005717 A1 | 1/2007 | LeVasseur | |
| 2007/0016514 A1* | 1/2007 | Al-Abdulqader | G06Q 10/06 705/37 |
| 2007/0226367 A1* | 9/2007 | Cai et al. | 709/238 |
| 2008/0147679 A1 | 6/2008 | Kelley | |
| 2008/0301454 A1 | 12/2008 | Malcolm | |
| 2009/0182788 A1 | 7/2009 | Chung | |
| 2012/0030297 A1* | 2/2012 | Levett | 709/206 |

* cited by examiner

SECURE ELECTRONIC MESSAGE CONVEYANCE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The embodiments disclosed within this specification relate to electronic messaging systems. More particularly, the embodiments relate to secure electronic message conveyance.

The use of electronic messaging, for example electronic mail (e-mail) and text messaging, has grown to an extent that electronic messaging is now ubiquitous throughout most of the industrialized world. For example, approximately 80% of the U.S. population uses e-mail at least time-to-time.

Electronic messaging is a very convenient form of communication. For example, if a user receives an e-mail that they feel may be of interest to others, they may simply forward the e-mail to those other users. Sometimes, however, an e-mail may contain confidential information. Thus, the original sender of the e-mail may not wish to have the content of the e-mail shared with other people other than the original recipients.

BRIEF SUMMARY OF THE INVENTION

The embodiments disclosed within this specification relate to electronic messaging systems. One embodiment of the present invention can include a method of secure electronic message conveyance. The method can include, via a processor, receiving a request to forward an electronic message originally received by a first user to at least a second user. The method further can include, via the processor, based on content contained in the electronic message, selecting from a plurality of approval entities at least one approval entity that is to determine whether the electronic message is approved to be forwarded to the at least a second user. Via the processor, an indication that indicates whether the electronic message is approved to be forwarded to the second user can be received from the selected approval entity. Responsive to the selected approval entity approving the forwarding of the electronic message to the second user, via the processor, the electronic message can be automatically forwarded to the second user.

Another embodiment of the present invention can include a method of secure electronic message conveyance that includes, via a processor, receiving an electronic message generated by at least a first user. The method also can include, via the processor, selecting at least one approval entity that is to determine whether the electronic message is approved to be sent to at least a second user, wherein the selected approval entity is not the first user. Via the processor, an indication that indicates whether the electronic message is approved to be sent to the second user can be received from the selected approval entity. Responsive to the selected approval entity approving the sending of the electronic message to the second user, via the processor, the electronic message can be automatically sent to the at least second user.

Yet another embodiment of the present invention can include a computer program product including a computer-readable storage having computer-usable program code that, when executed, causes a machine to perform the various steps and/or functions described herein.

DETAILED DESCRIPTION OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The embodiments disclosed herein relate to the secure conveyance of electronic messages. In one embodiment, when a user attempts to forward an electronic message to one or more other users, the electronic message can be intercepted pending an approval process. One or more approval entities can be selected and tasked with determining whether the electronic message is approved to be forwarded to the other user(s). If the approval entity or entities approve the electronic message to be forwarded, then the electronic message can be forwarded to the other user(s). If, however, the electronic message is not approved to be forwarded, the forwarding user can be notified that the electronic message may not be forwarded to the other user(s). In another embodiment, new electronic messages that are generated by a user can be submitted to the approval process.

In one aspect of the invention, an electronic message to be sent or forwarded can be edited before being forwarded. For example, terms or passages can be redacted from the electronic message, acronyms can be replaced by terms represented by the acronyms, spelling and/or grammar can be corrected, etc. The editing of the electronic message can be performed automatically and/or can be performed by the approval entity and/or approval entities.

As used herein, an electronic message is any form communication that is contained in an electronic format. Examples of electronic messages include, but are not limited to, electronic mail (e-mail), instant messages, task related messages, electronic action messages, calendaring and/or scheduling requests, telephone messages, web conferences, and the like. As used herein, a user is a person. An approval entity, as used herein, is a person, or a machine or system, tasked with determining whether electronic messages are approved to be sent or forwarded.

Figure 1:
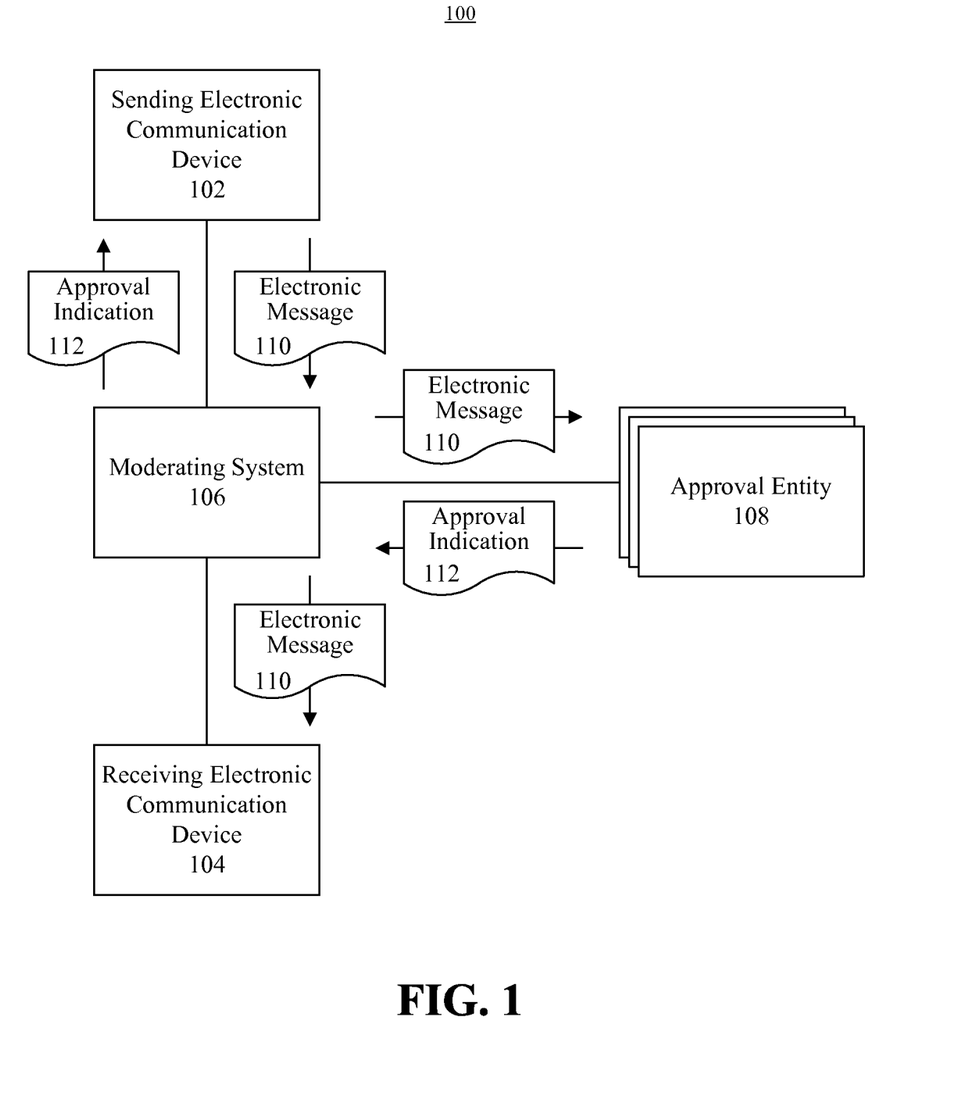
FIG. 1 is a block diagram illustrating a system for securely conveying electronic messages in accordance with one embodiment of the present invention.

FIG. 1 is a block diagram illustrating a system 100 for securely conveying electronic messages in accordance with one embodiment of the present invention. The system 100 can include a sending electronic communication device 102 and a receiving electronic communication device 104 (hereinafter "communication devices"). The communication devices 102, 104 can be computers (e.g., workstations, personal computers, mobile computers, tablet computers, web enabled devices, or the like), personal digital assistants, telephones, mobile telephones, or any other devices that communicate any form of electronic communication. In this regard, an electronic communication can be a text based electronic communication, electronically recorded audio and/or video, electronic based requests, tasks or actions, or the like.

The system 100 also can include a moderating system 106. The moderating system can be embodied as a computer (e.g., server, workstation, personal computer or application specific processing device) that is configured to receive electronic communications and perform electronic message moderating functions which will be described herein. The system 100 also can include one or more approval entities 108. In one embodiment, an approval entity can be a system tasked with approving the sending and/or forwarding of electronic messages. As such, an approval entity 108 can be a component of the moderating system 106, though this need not be the case. In another embodiment, an approval entity 108 can be a person tasked with approving the sending and/or forwarding of electronic messages. For example, the approval entity 108 can be a manager, an originator of an electronic message, or the user forwarding the electronic message.

In operation, a user of the communication device 102 can choose to generate an electronic message 110 or forward an electronic message 110, such as an electronic message originally received by the user. In one embodiment, in response to the user sending the electronic message 110 to another user (e.g., a user of the communication device 104), the moderating system 106 can automatically intercept the electronic message 110 before the electronic message is communicated to the user who is the intended recipient of the electronic message 110. The moderating system 106 can process the electronic message 110 to determine whether the electronic message 110 is approved to be sent or forwarded to the recipient.

The moderating system 106 can be configured to intercept all electronic messages, intercept electronic messages sent from certain users, and/or intercept electronic messages sent to certain users. By way of example, the moderating system 106 can be configured to intercept electronic messages sent by certain classes of users and/or sent to certain classes of users. In this regard, the user classifications can be based on user positions within an organization, divisions to which users belong, whether users are affiliated with an organization (e.g., employees, non-employees, contractors, etc.), or based on any other desired classification schemes.

In another embodiment, rather than the moderating system 106 automatically intercepting the electronic message 106, the sending user can request for approval of the electronic message 110 to be sent. For example, when the user sends the electronic message 110, the user can indicate an approval request. The approval request can be indicated by a field contained in a header or footer of the electronic message. In illustration, an approval request field can be set to a particular value in response to the user selecting, when sending or composing the electronic message 110, an approval request button, icon or user selectable option in an electronic messaging client. Alternatively, the user can direct the electronic message 106 to the moderating system 106, and approval request can be assumed by virtue of the electronic message being sent to the intended recipient via the moderating system 106. User selectable options can be provided in the electronic messaging client to route the electronic message 106 via the moderating system 106, for instance via an icon, button, or user selectable option within the electronic messaging system. In another embodiment, the user can generate a specific request message that requests approval to send the electronic message.

Regardless of whether the user requests the approval process or the moderating system 106 automatically intercepts the electronic message 110, the moderating system 106 can select one or more approval entities 108 that will determine whether the electronic message 110 is approved to be sent to the intended recipient. As noted, the approval entity 108 can be a person or a component of the moderating system 106, for example an application or routine that applies approval rules. The approval entity can process or review the electronic message 110 to determine whether the electronic message is approved to be sent to the intended recipient, and provide an approval indication 112 that indicates such. In a case in which the approval entity 108 is a person, the approval entity 108 can approve or disapprove the sending of the electronic message 110 in any suitable manner. In illustration, the approval entity can, via an electronic messaging client, select a button, icon or other field that indicates whether sending of the electronic message 110 is approved or disapproved. If the electronic message 110 is an audio message, such as a telephone message presented to the approval entity via a telephone, the approval entity 108 can be prompted to select an appropriate key or button on the telephone to indicate whether the sending of the message is approved or disapproved.

In one aspect of the inventive arrangements, a multi-step approval process can be implemented. For example, a first approval entity 108 can review or process the electronic message 110 and, depending on the results of that review, one or more other approval entities 108 can be selected to provide a further review of the electronic message 110. In illustration, the first approval entity 108 can be embodied within the moderating system 106, and the first approval entity 108 can classify electronic message 110 as being "approved," "disapproved" or "further review required." If further review is required, then one or more additional approval entities 108 can be selected to provide a determination as to whether the electronic message is approved to be sent to the intended recipient. For example, a manager or other person can be selected to review the electronic message 110. The user who forwarded or generated the electronic message 108 also can be selected in order to prompt that user to once again review the electronic message 110 to ensure that the user still wants to send the electronic message 110, for example if the electronic message 110 contains confidential information.

If the electronic message 110 does contain confidential information, such information can be emphasized in a suitable manner for presentation to the approval entity 108. For example, confidential information can be highlighted, underlined, italicized, and/or other effects can be applied to the text containing the confidential information. If the confidential information is presented as audio, the volume of the confidential portion of the audio can be increased or decreased, a tone can be played prior to and/or after presentation of the confidential portion of the audio, and/or any other suitable alert can be provided. If the confidential information is presented as video, the confidential portion of the video can be indicated, for example by presenting a suitable visual and/or audio alert.

A suitable speech recognition application can be implemented to translate audio information into suitable data which may be processed by the moderating system 106 to determine whether the audio contains confidential information. Such audio may be contained in the electronic message 110, for example if the electronic message is an audio message, within a body of the electronic message, or contained in an attachment to the electronic message 110. Similarly, a suitable image recognition application can be implemented to identify images to determine whether the images contain confidential information. Such images may be contained in the electronic message 110, for example in video if the electronic message is an audio/video message, within a body of the electronic message, or contained in an attachment to the electronic message 110.

In one embodiment, the selected approval entity or entities 108 can edit the electronic message. For example, the approval entity 108 can redact terms or passages from the electronic message, add terms or passages to the electronic message, replace acronyms with terms represented by the acronyms, correct spelling and/or grammar, etc. As noted, the editing of the electronic message can be performed automatically, for example via an approval entity embodied within the moderating system 106, or can be performed by one or more persons selected as approval entities. In this regard, an automated approval entity 108 can include a grammar/spelling correction application, a confidential information library, and/or any other data/functions applicable to editing electronic messages.

When the moderating system 106 has received the approval indication 112, the moderating system 106 can process the electronic message 110 based on whether the electronic message 110 is approved to be sent to the intended recipient. If the approval indication 112 indicates sending or forwarding of the electronic message 110 is approved, the moderating system 106 can send the electronic message to the intended recipient, for example by sending the electronic message 110 to the communication device 104. In addition, the moderating system 106 can send the approval indication 112 to the sender, for instance by sending the approval indication to the communication device 102. The approval indication can indicate that the electronic message 110 was approved to be sent, as well as indicate edits that were made to the electronic message, if any. If edits to the electronic message were made, optionally, the moderating system 106 can send the revised version of the electronic message 110 to the sender (e.g., to the communication device 102). If the sending of the electronic message to the indented recipient is not approved, the approval indication 112 sent to the sender of the electronic message 110 can indicate such.

Figure 2:
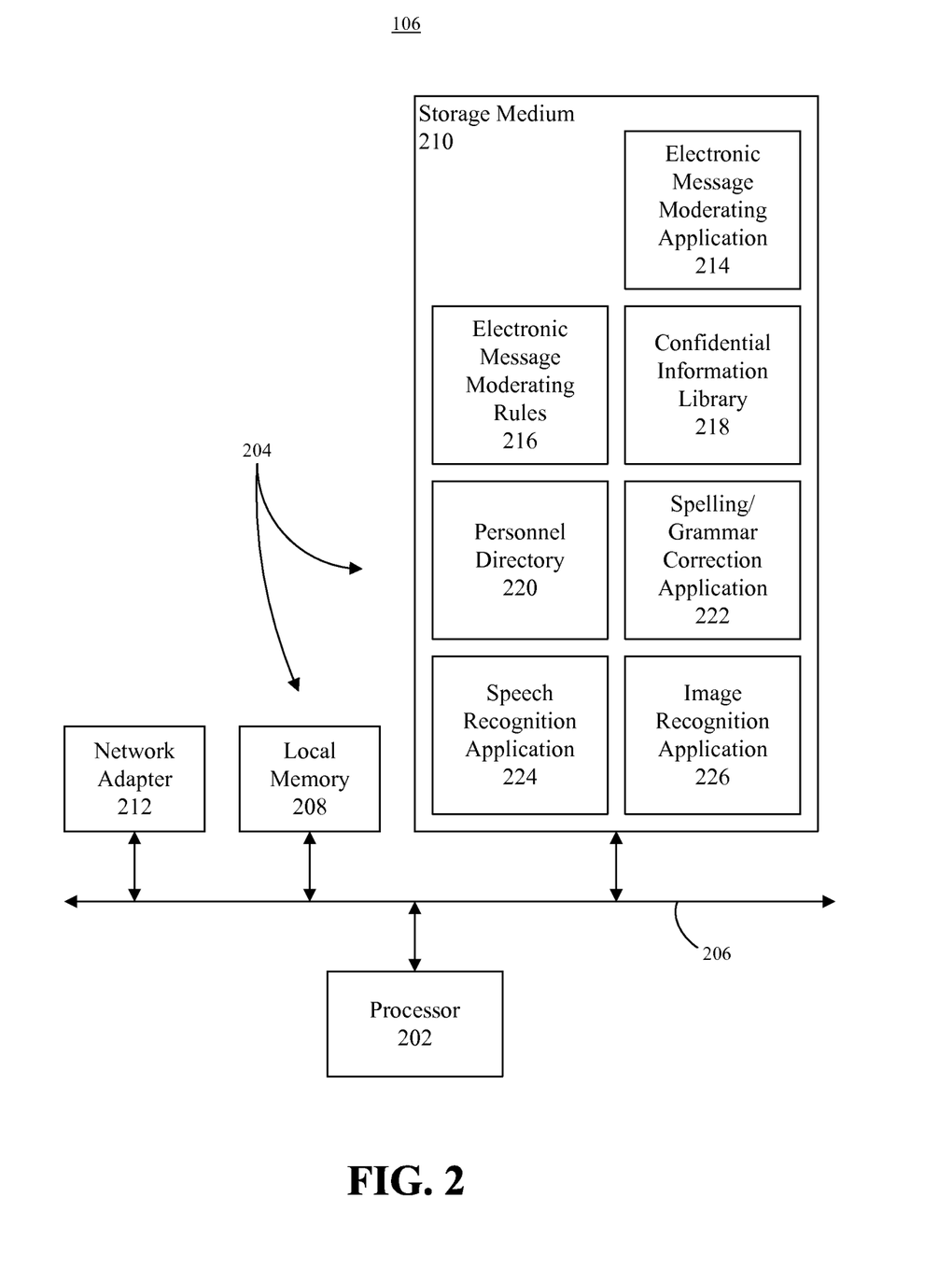
FIG. 2 is a block diagram illustrating an electronic message moderating system in accordance with one embodiment of the present invention.

FIG. 2 is a block diagram illustrating the electronic message moderating system 106 in accordance with one embodiment of the present invention. The moderating system 106 an include at least one processor 202 coupled to memory elements 204 through a system bus 206. As such, the moderating system 106 can store program code within memory elements 204. The processor 202 can execute the program code accessed from memory elements 204 via system bus 206. In one aspect, for example, the moderating system 106 can be implemented as computer that is suitable for storing and/or executing program code. It should be appreciated, however, that the moderating system 106 can be implemented in the form of any system comprising a processor and memory that is capable of performing the functions described within this specification.

The memory elements 204 can include one or more physical memory devices such as, for example, local memory 208 and one or more bulk storage devices, such as a machine-readable storage medium 210. Local memory 208 refers to random access memory or other non-persistent memory device(s) generally used during actual execution of the program code. The storage medium 210 can be implemented as a hard drive or other persistent data storage device. The moderating system 106 also can include one or more cache memories (not shown) that provide temporary storage of at least some program code in order to reduce the number of times program code must be retrieved from storage medium 210 during execution.

Input/output (I/O) devices such as a keyboard, a display, and a pointing device (not shown) optionally can be coupled to the moderating system 106. The I/O devices can be coupled to the moderating system 106 either directly or through intervening I/O controllers. One or more network adapters 212 also can be coupled to the processor 202 to enable the moderating system 106 to become coupled to other systems, computer systems, remote printers, and/or remote storage devices through intervening private or public networks. Modems, cable modems, and Ethernet cards are examples of different types of network adapters that can be used with the moderating system 106.

As pictured in FIG. 1, the memory elements 204 can store an electronic message moderating application (hereinafter "moderating application") 214. The moderating application 214, being implemented in the form of executable program code, can be executed by the moderating system 106 to provide secure electronic message conveyance, as described herein. Optionally, the moderating system 106 also can store electronic message moderating rules (hereinafter "moderating rules") 216, a confidential information library 218, a personnel directory 220, a spelling/grammar correction application 222, a speech recognition application 224 and an image recognition application. In another embodiment, one or more of these elements 214-226 can be stored on another system with which the moderating system is communicatively linked.

The moderating application 214 can process the moderating rules 216 to automatically approve or disapprove the sending of the electronic message, to determine whether further review of the electronic message is required for the approval process, to select other approval entities, to edit the electronic message, etc. In this regard, the moderating application 214 can access the confidential information library 218 while processing the electronic message to identify confidential information within the electronic message. As noted, the confidential information can be indicated to an approval entity. The moderating application 214 can cause the speech recognition application 224 and image recognition application 226 to be executed, when appropriate, to facilitate the identification of confidential information contained in audio and/or video electronic messages.

The moderating application 214 can access the personnel directory 220 in order to select one or more approval entities who are to approve or disapprove sending of the electronic message. The moderating application 214 also can access the personnel directory 220 to determine where the sender, recipient and/or approval entities are located in an organizational hierarchy, and apply the moderating rules 216 based on such locations. The spelling/grammar correction application 222 can be applied to the electronic message to correct spelling and/or grammar in the electronic message, replace acronyms with terms represented by the acronyms, or the like.

Figure 3:
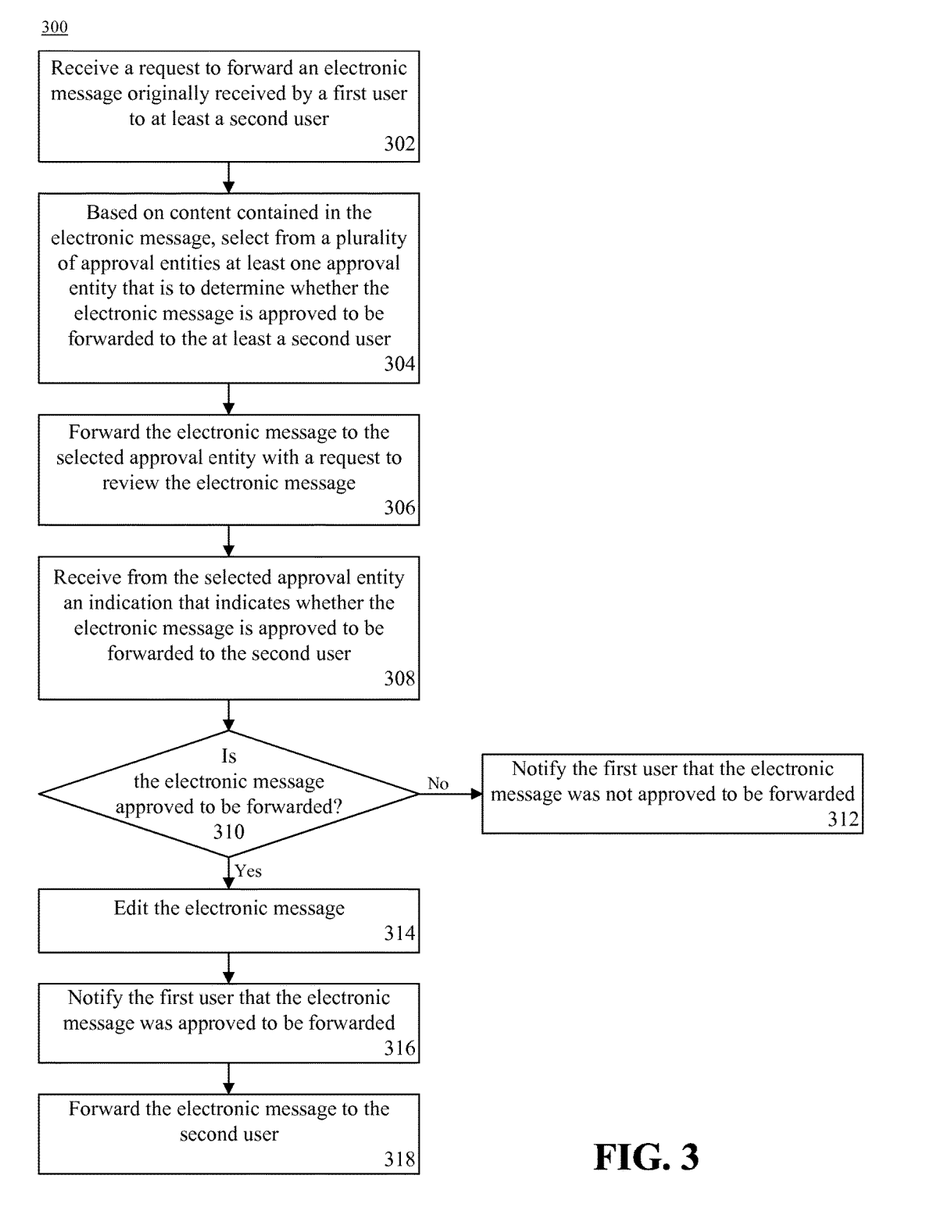
FIG. 3 is a flow chart illustrating a method of securely conveying electronic messages in accordance with one embodiment of the present invention.

FIG. 3 is a flow chart illustrating a method 300 of securely conveying electronic messages in accordance with one embodiment of the present invention. At step 302, a request can be received to forward an electronic message, originally received by a first user, to at least a second user. In one embodiment, the request can be indicated by an attempt to forward the electronic message. In yet another embodiment, the request can be indicated by a field within the electronic message, for example within a header or footer of the electronic message. In another embodiment, the request can be a specific request message that is communicated.

At step 304, based on content contained in the electronic message, at least one approval entity can be selected from a plurality of approval entities. The selected approval entity can determine whether the electronic message is approved to be forwarded to the at least a second user. As noted, the approval entity can be a person or an approval system/application.

At step 306, the electronic message, and a request for review, can be forwarded to the approval entity. The request can be indicated in the electronic message, for example in a subject line or body of the electronic message, or the request can be indicated in a separate electronic message. In another embodiment, the electronic message need not be forwarded to the approval entity. Instead, the request to review the electronic message can indicate to the approval entity where the electronic message may be accessed for review purposes.

At step 308, an indication that indicates whether the electronic message is approved to be forwarded to the second user can be received from the selected approval entity. Referring to decision box 310, if the electronic message is not approved to be forwarded, at step 312 the first user can be notified that the electronic message was not approved to be forwarded. For example, a disapproval message can be sent to the first user. If, however, the electronic message is approved to be forwarded, at step 314 the electronic message can be automatically edited. In other embodiments, the electronic message can be edited by the approval entity, and/or the electronic message can be automatically edited before the electronic message is forwarded to the approval entity.

At step 316, the first user can be notified that the electronic message was approved to be forwarded. For example, an approval message can be sent to the first user. At step 318, the electronic message can be forwarded to the second user.

Figure 4:
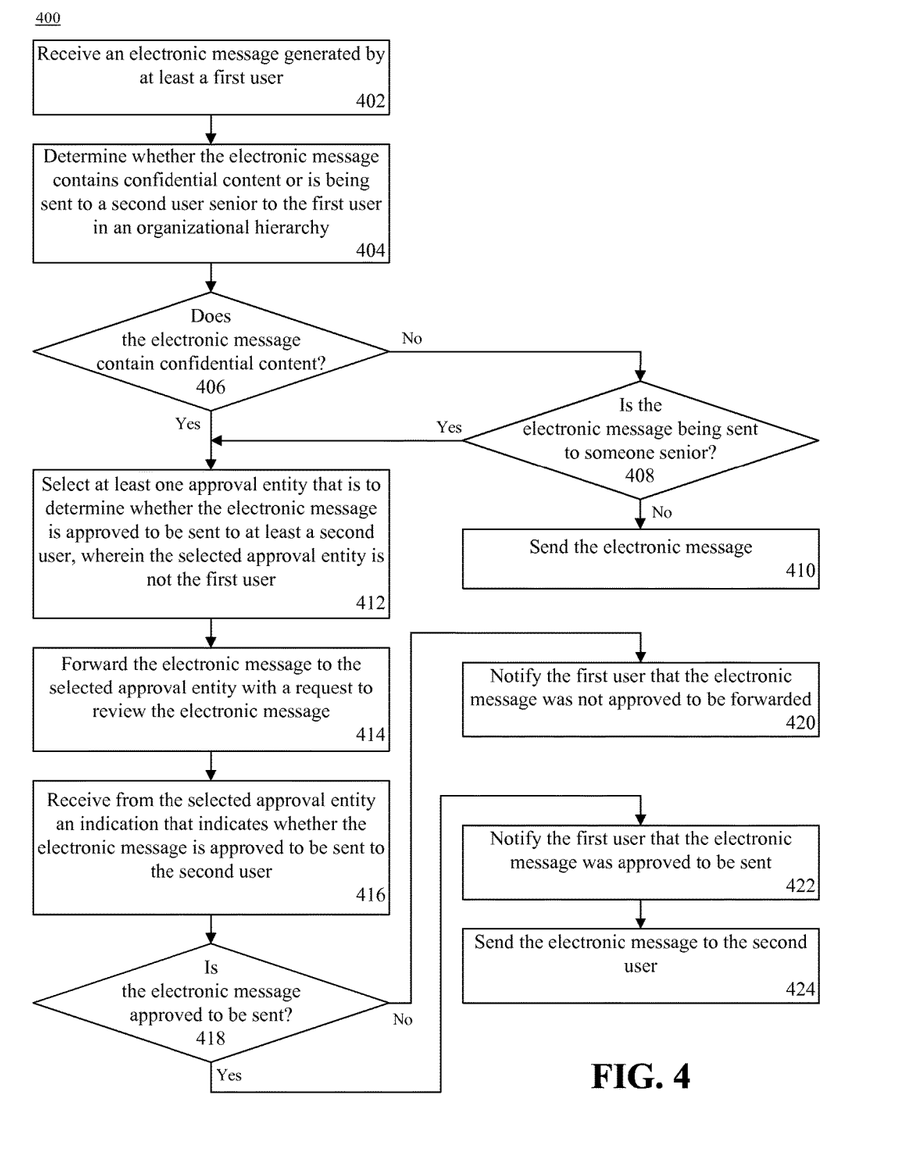
FIG. 4 is a flow chart illustrating a method of securely conveying electronic messages in accordance with another embodiment of the present invention.

FIG. 4 is a flow chart illustrating a method 400 of securely conveying electronic messages in accordance with another embodiment of the present invention. At step 402, an electronic message generated by at least a first user can be received. At step 404, a determination can be made as to whether the electronic message contains confidential content or is being sent to a second user senior to the first user in an organizational hierarchy. Referring to decision boxes 406 and 408, if the electronic message does not contain confidential content and is not being sent to a second user senior to the first user in an organizational hierarchy, at step 410 the electronic message can be sent.

If, however, the electronic message does contain confidential content or is being sent to a second user who is senior to the first user in the organizational hierarchy, at step 412 at least one approval entity can be selected. The approval entity can determine whether the electronic message is approved to be sent to at least a second user. In one embodiment, the selected approval entity is not the first user.

At step 414, the electronic message, and a request for review, can be forwarded to the approval entity. As noted, the request can be indicated in the electronic message, for example in a subject line or body of the electronic message, or the request can be indicated in a separate electronic message. In another embodiment, the electronic message need not be forwarded to the approval entity. Instead, the request to review the electronic message can indicate to the approval entity where the electronic message may be accessed for review purposes.

At step 416, an indication that indicates whether the electronic message is approved to be sent to the second user can be received from the selected approval entity. Referring to decision box 418, if the electronic message is not approved to be sent, at step 420 the first user can be notified that the electronic message was not approved to be sent. For example, a disapproval message can be sent to the first user. If, however, the electronic message is approved to be sent, at step 422 the first user can be notified that the electronic message was approved to be sent. For example, an approval message can be sent to the first user. At step 424, the electronic message can be sent to the second user.

Like numbers have been used to refer to the same items throughout this specification. The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed within a moderating system, comprising:
    receiving a request to forward, to a second user, an electronic message originally received by a first user and including a message header and a message body;
    selecting, based upon content contained within the message body, an approval entity from a plurality of approval entities;
    receiving, from the selected approval entity, an indication that the electronic message is approved to be forwarded to the second user; and
    forwarding, based upon the indication, the electronic message to the second user.

2. The method of claim 1, wherein
    the selected approval entity causes the electronic message to be edited prior to being forwarded to the second user.

3. The method of claim 2, wherein
    the edited electronic message is forwarded to the first user prior to being forwarded to the second user.

4. The method of claim 2, wherein
    the selected approval entity edits the electronic message, and
    the moderating system receives the edited electronic message from the selected approval entity.

5. The method of claim 1, wherein
    the selected approval entity receives, from the moderating system, a copy of the electronic message.

6. The method of claim 1, wherein
    the request is indicated within a field contained in the message header of the electronic message.

7. The method of claim 1, wherein
    the moderating system automatically intercepts the message being sent from the first user to the second user.

8. A moderating system, comprising:
a hardware processor, wherein the hardware processor is configured to initiate the following operations:
  receiving a request to forward, to a second user, an electronic message originally received by a first user and including a message header and a message body;
  selecting, based upon content contained within the message body, an approval entity from a plurality of approval entities;
  receiving, from the selected approval entity, an indication that the electronic message is approved to be forwarded to the second user; and
  forwarding, based upon the indication, the electronic message to the second user.

9. The system of claim 8, wherein
the selected approval entity causes the electronic message to be edited prior to being forwarded to the second user.

10. The system of claim 9, wherein
the edited electronic message is forwarded to the first user prior to being forwarded to the second user.

11. The system of claim 9, wherein
the selected approval entity edits the electronic message, and
the moderating system receives the edited electronic message from the selected approval entity.

12. The system of claim 8, wherein
the selected approval entity receives, from the moderating system, a copy of the electronic message.

13. The system of claim 8, wherein
the request is indicated within a field contained in the message header of the electronic message.

14. The system of claim 8, wherein
the moderating system automatically intercepts the message being sent from the first user to the second user.

15. A computer program product, comprising:
a computer-readable storage device having stored thereon computer-readable program code that, when executed by a computer hardware system including a moderating system, causes the computer hardware system to perform:
  receiving a request to forward, to a second user, an electronic message originally received by a first user and including a message header and a message body;
  selecting, based upon content contained within the message body, an approval entity from a plurality of approval entities;
  receiving, from the selected approval entity, an indication that the electronic message is approved to be forwarded to the second user; and
  forwarding, based upon the indication, the electronic message to the second user.

16. The computer program product of claim 15, wherein
the selected approval entity causes the electronic message to be edited prior to being forwarded to the second user.

17. The computer program product of claim 16, wherein
the edited electronic message is forwarded to the first user prior to being forwarded to the second user.

18. The computer program product of claim 16, wherein
the selected approval entity edits the electronic message, and
the moderating system receives the edited electronic message from the selected approval entity.

19. The computer program product of claim 15, wherein
the selected approval entity receives, from the moderating system, a copy of the electronic message.

20. The computer program product of claim 15, wherein
the request is indicated within a field contained in the message header of the electronic message.

21. The computer program product of claim 15, wherein
the moderating system automatically intercepts the message being sent from the first user to the second user.

* * * * *